United States Patent
Li et al.

(10) Patent No.: US 11,629,157 B2
(45) Date of Patent: Apr. 18, 2023

(54) FLUORO-BORON PYRROLE LIQUID CRYSTAL COMPOUNDS CONTAINING 8-(BISPHENYLETHYNYL)-ESTER GROUP FLEXIBLE MULTIPLE RING, PREPARATION METHOD AND USE THEREOF

(71) Applicant: DALIAN UNIVERSITY OF TECHNOLOGY, Liaoning (CN)

(72) Inventors: Xiaolian Li, Liaoning (CN); Rouchen Pan, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/256,144

(22) PCT Filed: Jan. 22, 2020

(86) PCT No.: PCT/CN2020/073718
§ 371 (c)(1),
(2) Date: Dec. 24, 2020

(87) PCT Pub. No.: WO2020/143842
PCT Pub. Date: Jul. 16, 2020

(65) Prior Publication Data
US 2021/0277027 A1    Sep. 9, 2021

(30) Foreign Application Priority Data
Jan. 11, 2019    (CN) .......................... 201910026827.2

(51) Int. Cl.
*C07F 5/02*    (2006.01)
*C09K 11/06*    (2006.01)
(Continued)

(52) U.S. Cl.
CPC .............. *C07F 5/027* (2013.01); *C09K 11/06* (2013.01); *C09K 19/04* (2013.01); *C09K 19/60* (2013.01);
(Continued)

(58) Field of Classification Search
CPC ..................................................... C07F 5/027
See application file for complete search history.

(56) References Cited

U.S. PATENT DOCUMENTS

2015/0376505 A1    12/2015  Goto et al.

FOREIGN PATENT DOCUMENTS

CN    106433186 A    2/2017

OTHER PUBLICATIONS

Godoy, Jazmin et al., "Synthesis of a Fluorescent BODIPY-tagged ROMP catalyst and initial polymerization-propelled diffusion studies", Apr. 16, 2015, Tetrahedron, vol. 71, No. 35, 5966-5968. (Year: 2015).*

(Continued)

*Primary Examiner* — Chanceity N Robinson
*Assistant Examiner* — Anna Malloy
(74) *Attorney, Agent, or Firm* — Novick, Kim & Lee, PLLC; Allen Xue

(57) ABSTRACT

A series of 8-(bisphenylethynyl)-ester flexible multiple ring-containing fluoroboron pyrrole liquid crystal dyes are synthesized by introducing a diphenylethynyl rigid structure at position 8 of a boron-dipyrromethene core via a Sonogashira coupling reaction, and a flexible multiple ring such as bicyclohexane, or cholesterol is connected to the biphenylethynyl via an esterification reaction. The dye compounds all have maximum emission wavelengths in methylene chloride concentrated around 525 nm, present green fluorescence, and show good dichroic colour ratios and ordered parameters in E7 liquid crystal. The liquid crystal com- (Continued)

pounds are in a liquid crystal intermediate phase within the range of 100-280° C., and may be used for manufacturing liquid crystal display products, especially as guest dyes for guest-host mode liquid crystal displays. The response time can be improved and a rapid response effect achieved when the compounds are added to E7 liquid crystal and used for a guest-host display mode.

5 Claims, 4 Drawing Sheets

(51) Int. Cl.
*C09K 19/04* (2006.01)
*C09K 19/60* (2006.01)

(52) U.S. Cl.
CPC ........... *C09K 2019/0433* (2013.01); *C09K 2211/1022* (2013.01); *C09K 2323/031* (2020.08)

(56) References Cited

OTHER PUBLICATIONS

Benstead, Michael et al., "Mesogenic BODIPY's: an investigation of the correlation between liquid crystalline behaviours and fluorescence intensity", Mar. 7, 2011, Photochemical & Photobiological Sciences, Vo. 10, 992-999. (Year: 2011).*

Godoy, Jazmin et al.; Synthesis of a fluorescent BODIPY-tagged ROMP catalyst and initial polymerization-propelled diffusion studies; Tetrahedron, vol. 71, No. 35, Apr. 16, 2015, pp. 5966-5968, figure 1, Schemes 1-3, and figures 2-3.

Gartzia-Rivero, Leire et al.; Photophysical and Laser Properties of Cassettes based on a BODIPY and Rhodamine Pair; Chemistry—An Asian Journal, vol. 8, No. 12, Dec. 31, 2013, pp. 3133-3141.

Benstead, Michael et al.; Mesogenic BODIPYs: an investigation of the correlation between liquid crystalline behaviour and fluorescence intensity; Photochemical & Photobiological Sciences; 2011, vol. 10, Mar. 7, 2011, pp. 992-999.

* cited by examiner

FLUORO-BORON PYRROLE LIQUID CRYSTAL COMPOUNDS CONTAINING 8-(BISPHENYLETHYNYL)-ESTER GROUP FLEXIBLE MULTIPLE RING, PREPARATION METHOD AND USE THEREOF

TECHNICAL FIELD

The present invention relates to a type of fluoro-boron pyrrole liquid crystal compound containing 8-(bisphenylethynyl)-ester group flexible multiple ring, a method for preparing and use thereof, belonging to the field of display materials.

BACKGROUND ART

In the electronic information industry chain, liquid crystal display panels are in a high-end position, and they are also key components in digital products such as computers and mobile communication terminals. The innovation of display technology can drive the development of informatization, so it is particularly important to strengthen the in-depth research on liquid crystal display panels.

"Guest-host" display is a new display mode that has emerged in recent years. "Guest-host" (GH) mode is a working mode for displaying colored changes proposed by G. Heilmeier et al., which is proposed almost simultaneously with the DS mode. Some dichroic dyes are doped into the nematic liquid crystal host material to form a pair of "guest-host" materials, which are applied with an electric field, and the orientation of the liquid crystal molecules changes. The "guest-host" (GH) mode uses light absorption of dichroic dyes that change molecular orientation to achieve display.

The fluorescent "guest-host" type display is an improvement of the traditional "guest-host" type display, which applies fluorescent dichroic dyes to liquid crystal displays, so that not only the intensity of light is absorbed, but the intensity of the emitted light can also be controlled by the electric field, so as to integrate the advantages of the emissive display with the characteristics of the traditional liquid crystal display to make a more portable and low-power electronic device.

Simple liquid crystal materials can no longer meet the various characteristics of liquid crystal displays, such as low light source utilization, thick display panels, and slow response time. Therefore, it is an obvious trend to use liquid crystal compounds and dyes to compound liquid crystal materials to obtain liquid crystal materials with superior performance. The compounded liquid crystal dyes can have a higher and more stable liquid crystal phase temperature range, higher contrast and faster response time.

SUMMARY OF THE INVENTION

In order to solve the problem of the lack of fluorescent dichroic dyes with good performance in the prior art, the present invention provides a fluorescent dichroic dye with green fluorescence, high molar coefficient, good dichroic ratio and order parameters in a liquid crystal, suitable for a liquid crystal display product and capable of improving response time.

One of the technical objectives of the present invention is to provide a new type of fluorescent dichroic dye.

A type of boron-dipyrromethene (BODIPY) fluorescent dichroic dye containing 8-(bisphenylethynyl)-ester group flexible multiple ring, the compound has a chemical molecular structure in general Formula B:

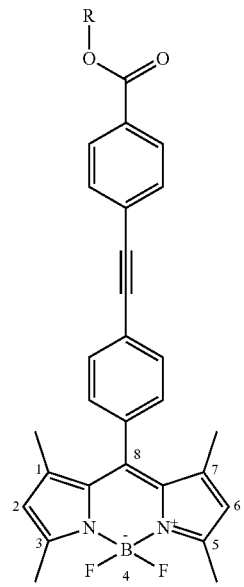

Further, in the fluorescent dichroic liquid crystal dye, R is selected from propyl dicyclohexyl methyl, butyl dicyclohexyl methyl, pentyl dicyclohexyl methyl, propyl dicyclohexyl ethyl, butyl dicyclohexyl ethyl, pentyl dicyclohexyl ethyl and cholesteryl. Wherein, R is preferably selected from pentyl dicyclohexyl methyl, propyl dicyclohexyl ethyl, and cholesteryl.

Another technical objective of the present invention is to provide a method for preparing the above fluorescent dichroic dye, comprising steps of:

Synthesizing a boron-dipyrromethene parent from 2,4-dimethylpyrrole and p-iodobenzoyl chloride as basic raw materials, followed by synthesizing p-ethynyl benzoic acid by Sonogashira coupling with p-iodobenzoic acid as a raw material and trimethylsilylacetylene. Then, respectively linking the p-ethynyl benzoic acid with propyl dicyclohexyl methanol, butyl dicyclohexyl methanol, pentyl dicyclohexyl methanol, propyl dicyclohexyl methyl methanol, butyl dicyclohexyl methyl methanol, pentyl dicyclohexyl methyl methanol, or cholesterol by esterification reaction, followed by linking compound 4 with the boron-dipyrromethene parent by Sonogashira coupling reaction to form a bisphenylacetylene linear structure, therefore generating the fluorescent dichroic dye.

The compound 4 is selected from the group consisting of 4-ethynyl phenylpropyl dicyclohexyl methanol ester, 4-ethynyl phenylbutyl dicyclohexyl methanol ester, 4-ethynyl phenylpentyl dicyclohexyl methanol ester, 4-ethynyl phenylpropyl dicyclohexyl methyl methanol ester, 4-ethynyl phenylbutyl dicyclohexyl methyl methanol ester, 4-ethynyl phenylpentyl dicyclohexyl methyl methanol ester, 4-ethynyl phenyl cholesteryl ester.

The synthesis pathway is as follows:

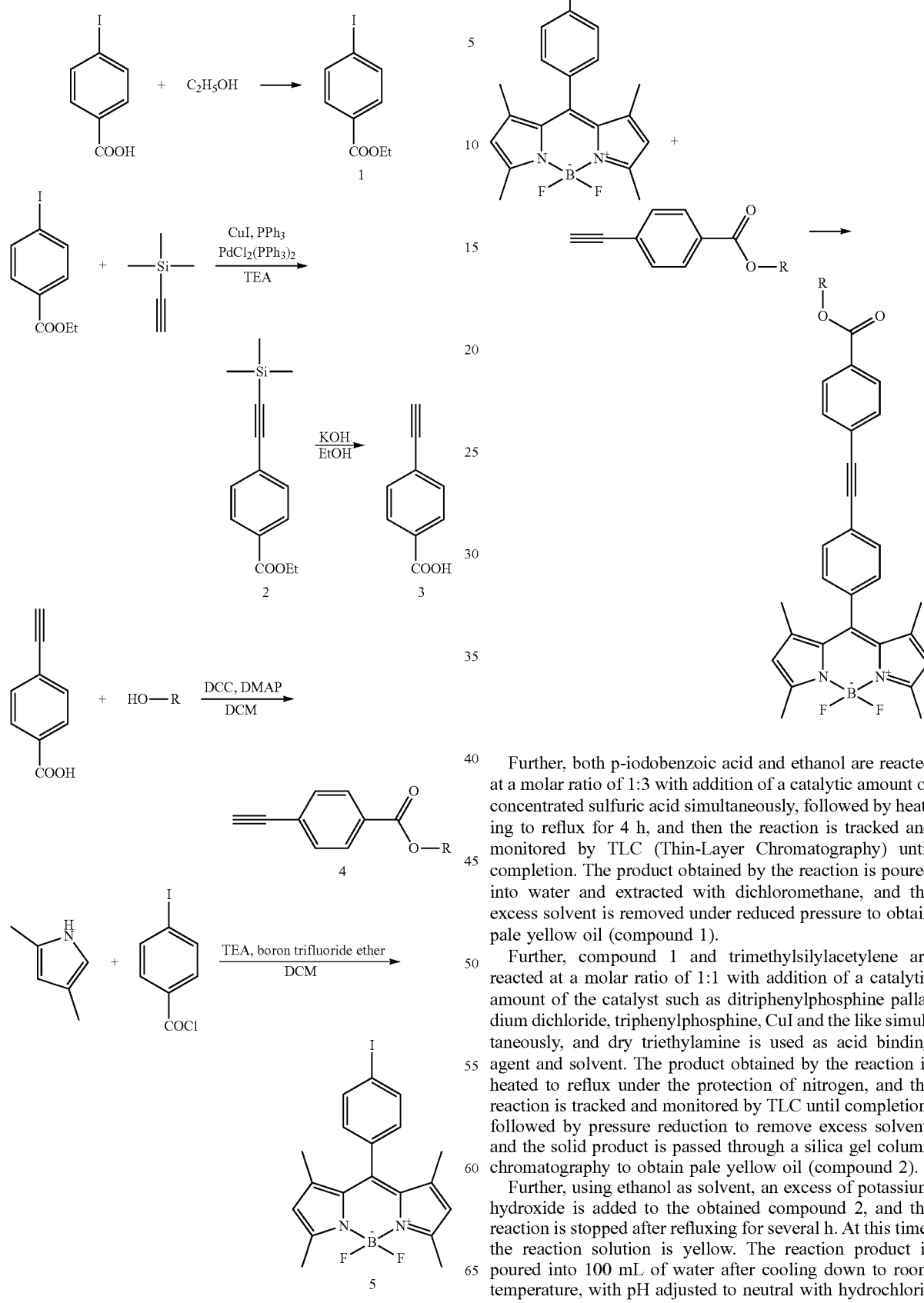

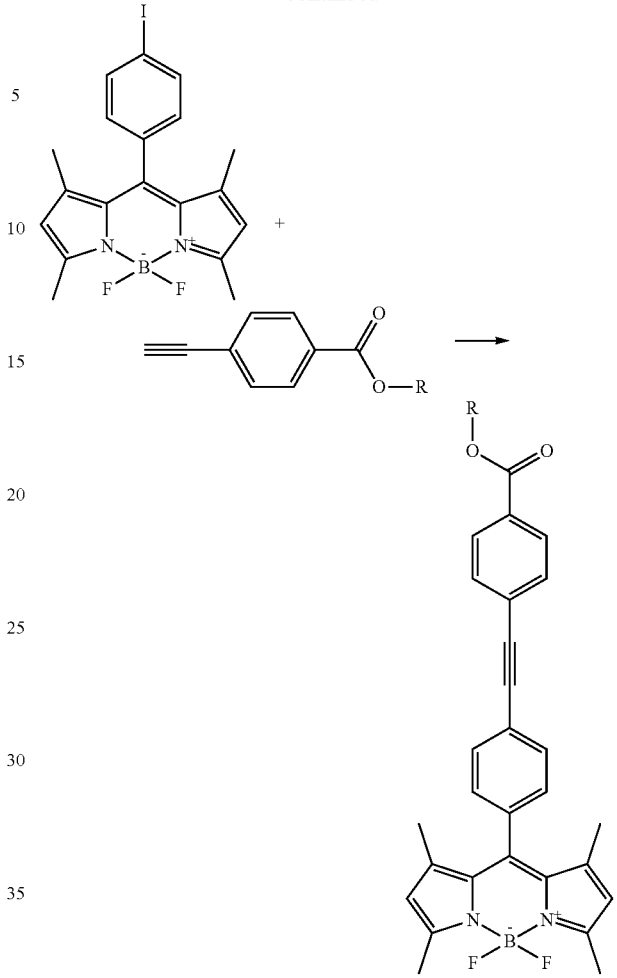

Further, both p-iodobenzoic acid and ethanol are reacted at a molar ratio of 1:3 with addition of a catalytic amount of concentrated sulfuric acid simultaneously, followed by heating to reflux for 4 h, and then the reaction is tracked and monitored by TLC (Thin-Layer Chromatography) until completion. The product obtained by the reaction is poured into water and extracted with dichloromethane, and the excess solvent is removed under reduced pressure to obtain pale yellow oil (compound 1).

Further, compound 1 and trimethylsilylacetylene are reacted at a molar ratio of 1:1 with addition of a catalytic amount of the catalyst such as ditriphenylphosphine palladium dichloride, triphenylphosphine, CuI and the like simultaneously, and dry triethylamine is used as acid binding agent and solvent. The product obtained by the reaction is heated to reflux under the protection of nitrogen, and the reaction is tracked and monitored by TLC until completion, followed by pressure reduction to remove excess solvent, and the solid product is passed through a silica gel column chromatography to obtain pale yellow oil (compound 2).

Further, using ethanol as solvent, an excess of potassium hydroxide is added to the obtained compound 2, and the reaction is stopped after refluxing for several h. At this time, the reaction solution is yellow. The reaction product is poured into 100 mL of water after cooling down to room temperature, with pH adjusted to neutral with hydrochloric acid solution, filtered, washed and dried to obtain a white solid. The crude product is passed through a silica gel column to obtain 4-ethynyl-benzoic acid (compound 3).

Further, compound 3 and one of propyl dicyclohexyl methanol, butyl dicyclohexyl methanol, pentyl dicyclohexyl methanol, propyl dicyclohexyl methyl methanol, butyl dicyclohexyl methyl methanol, pentyl dicyclohexyl methyl methanol, cholesterol are fed at a molar ratio of 1:1 in dichloromethane as solvent with addition of 1.5 times equivalent of dicyclohexylcarbodiimide (DCC) and a catalytic amount of 4-dimethylaminopyridine (DMAP), followed by reaction at room temperature for 24 h with removal of excess solvent under reduced pressure, and the solid product is passed through a silica gel column chromatography to obtain a pure white solid (compound 4).

Further, p-iodobenzoyl chloride and 2,4-dimethylpyrrole are reacted at a molar ratio of 1:2 at room temperature for 6 h, followed by addition of a catalytic amount of triethylamine, and an appropriate amount of boron trifluoride ether is added after half an hour. The reaction is tracked and monitored by TLC until completion followed by removal of excess solvent under reduced pressure. The red-brown solid crude product is passed through a silica gel column chromatography to obtain a red solid (compound 5).

Further, compound 4 and compound 5 are mixed at a molar ratio of 1:1 with addition of a catalytic amount of the catalyst such ditriphenylphosphine palladium dichloride, triphenylphosphine, CuI and the like simultaneously, and dry triethylamine is used as acid binding agent and solvent. The mixture obtained by the reaction is refluxed for 8-10 h under the protection of nitrogen, then cooled to room temperature, spin-dried under reduced pressure, and separated by a silica gel column (eluent: $CH_2Cl_2$: PE=1:3) to obtain solid compound DC1-DC3, that is the liquid crystal dye.

The present invention provides a use of the above compound as a fluorescent dichroic dye.

The dye compound of the present invention also has a liquid crystal phase, and can also be used as a liquid crystal component to be added to the liquid crystal host to improve the response time of the liquid crystal host. The liquid crystal main body is smectic liquid crystal, nematic liquid crystal or cholesteric liquid crystal.

The present invention also provides a use of the above compound as a liquid crystal dye.

Another aspect of the present invention provides a use of the above fluorescent dichroic dye in the manufacture of a liquid crystal display product. The liquid crystal display product is a guest-host liquid crystal display. Specifically, it is used as a guest liquid crystal dye, which is used to prepare a guest-host liquid crystal display.

Another objective of the present invention is to provide a type of guest-host liquid crystal display, which uses the fluorescent dichroic dye of the present invention as the guest liquid crystal dye.

The present invention provides a use of the above compound as a liquid crystal material; the liquid crystal material is a color liquid crystal material.

The beneficial effects of the present invention:

Firstly, BODIPY is used as a parent to synthesize multiple flexible cyclic liquid crystal dyes containing both the rigid structure of bisphenylacetylene and the ester functional group. The structure is novel and enriches the types of fluorescent bidirectional dyes;

Secondly, by modifying the position 8 of BODIPY, the excellent photochemical and physical properties of BODIPY fluorescent dyes, such as higher molar extinction coefficient, good monochromatic fluorescence and higher light stability, are retained;

Thirdly, the introduction of a fluorine-containing BODIPY structure into the flexible multiple ring structure containing (bisphenylethynyl)-ester group is beneficial to reduce the viscosity of the compound, improve the dichroic ratio, order parameters and dielectric anisotropy, etc.;

Fourthly, the compound of the present invention is added to the host liquid crystal E7 as a guest dye, and the flexible multiple ring structure is beneficial to reduce the response time of the host liquid crystal;

The fluorescent dichroic dye of the present invention has a high dichroic ratio and order parameters in liquid crystals. The maximum dichroic ratio is 8.91 and the maximum order parameter is 0.725. It can be used to manufacture guest-host liquid crystal displays as a guest liquid crystal dye.

DETAILD DESCRIPTION OF THE EMBODIMENTS

Figure 1:
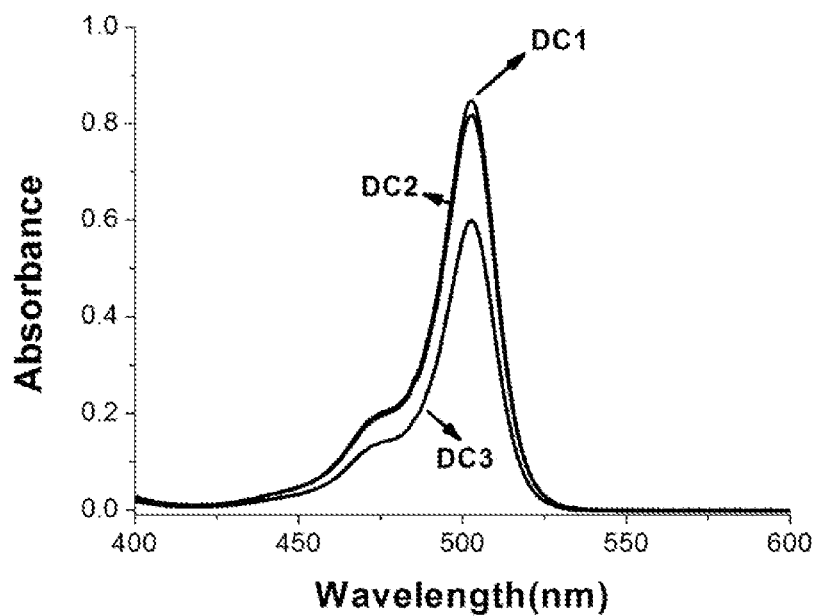
FIG. 1 is the UV absorption graph of DC1-DC3 prepared in Examples 1-3 in dichloromethane.
Figure 2:
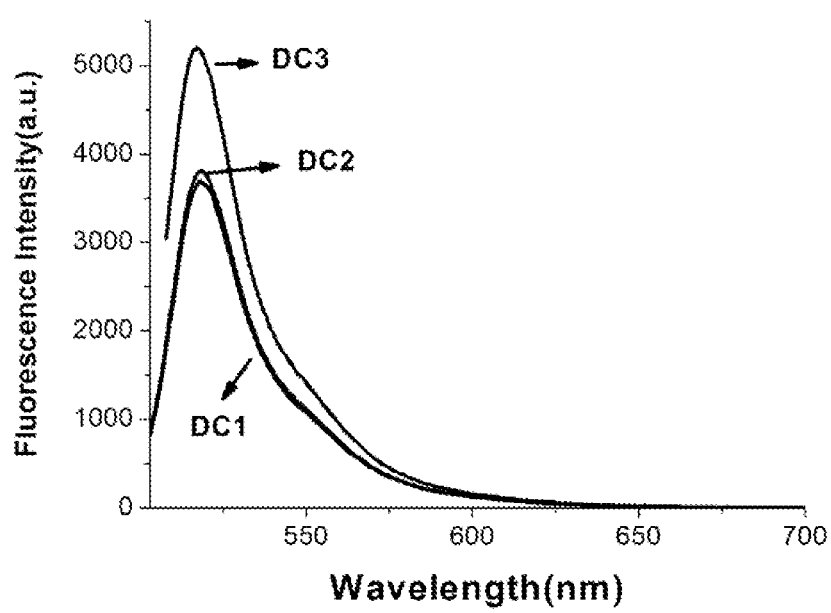
FIG. 2 is the fluorescence spectrum of DC1-DC3 prepared in Examples 1-3 in dichloromethane.

The following non-limiting examples may enable those skilled in the art to more fully understand the present invention, but do not limit the present invention in any way.

Wherein raw materials such as pentyl dicyclohexyl methanol, propyl dicyclohexyl methyl methanol, and cholesterol were purchased.

Example 1
Synthesis of liquid crystal dye DC1
(1) Synthesis of ethyl p-iodobenzoate (compound 1)

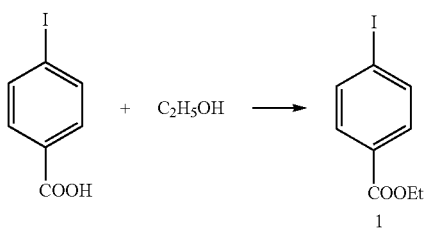 [SMILES: "C2H5OH" ; O=C(O)c1ccc(I)cc1 ; CCOC(=O)c1ccc(I)cc1]

2.48 g of p-iodobenzoic acid and 20 ml of ethanol were added into a 50 ml double-necked round-bottomed flask to react, and a catalytic amount of concentrated sulfuric acid was added simultaneously, followed by heating to reflux, then the reaction was tracked and monitored by TLC until completion. The product obtained by the reaction was poured into water and extracted with dichloromethane, and the excess solvent was removed under reduced pressure to obtain 2.76 g of pale yellow oil with a yield of 85%.

(2) Synthesis of 4-trimethylsilylethynyl-ethyl benzoate (compound 2)

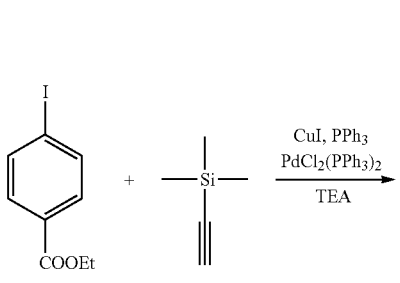

276 mg (8.5 mmol) of ethyl p-iodobenzoate and 2 mL (10 mmol) of trimethylsilylacetylene, 70 mg of ditriphenylphosphine palladium dichloride, 150 mg of triphenylphosphine, and 80 mg of CuI as catalysts were added to a 50 mL double-necked round-bottomed flask, and 15 mL of dry triethylamine was used as acid binding agent and solvent. The product was stirred under nitrogen protection and heated to reflux until completing the reaction. The triethylamine was removed under reduced pressure, the crude product was passed through a silica gel column (eluent: DCM:PE=1:5), and the solvent was removed under reduced pressure to obtain 1.88 g of white solid 4-trimethylsilylethynyl-benzoic acid ethyl ester with a yield of 90%.

(3) Synthesis of 4-ethynyl benzoic acid (compound 3)

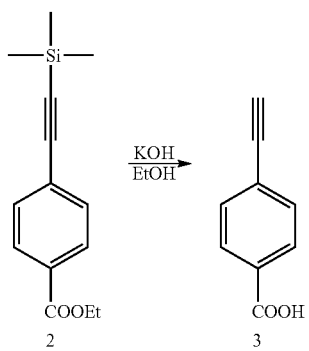

Using ethanol as solvent, 3 times equivalent of potassium hydroxide was added to the obtained compound 2, and the reaction was stopped after refluxing for several hours. At this time, the reaction solution was yellow. The reaction product was poured into 100 mL of water after cooling down to room temperature, with pH adjusted to neutral with hydrochloric acid solution, filtered, washed and dried to obtain a white solid. The crude product was passed through a silica gel column to obtain 1.06 g of 4-ethynyl-benzoic acid with a yield of 92%.

(4) Synthesis of 4-ethynylphenylpentyl dicyclohexyl carbinol ester (compound 4)

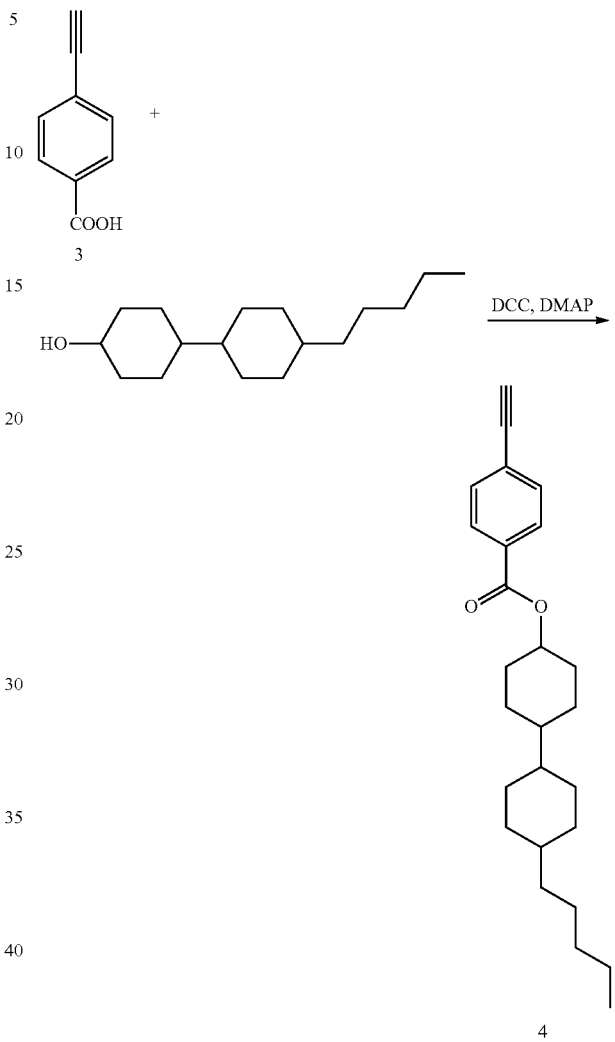

146 mg of compound 3 and 252 mg of pentyl dicyclohexyl methanol were fed into a 50 ml double-necked round-bottomed flask in dichloromethane as solvent with addition of 1.5 times equivalent of dicyclohexylcarbodiimide (DCC) and a catalytic amount of 4-dimethylaminopyridine (DMAP), followed by reaction at room temperature for 24 h with removal of excess solvent under reduced pressure, and the solid product was passed through a silica gel column chromatography to obtain 345 mg of pure white solid with a yield of 91%.

(5) Synthesis of 8-iodine-BODIPY (compound 5)

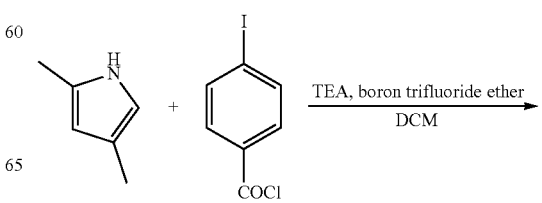

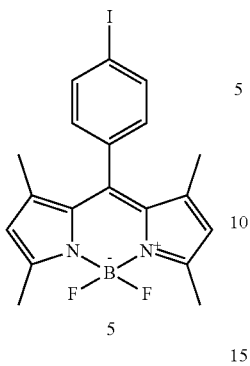

2.65 g of p-iodobenzoyl chloride and 3 ml of 2,4-dimethylpyrrole were reacted at room temperature for 6 h, followed by addition of 4 ml of triethylamine, and 9 ml of boron trifluoride ether was added after half an hour. The reaction was tracked and monitored by TLC until completion followed by removal of excess solvent under reduced pressure. The red-brown solid crude product was passed through a silica gel column chromatography with an eluent of DCM:PE=1:6 and the solvent was removed under reduced pressure to obtain 3.6 g of a red solid with a yield of 80%.

(6) Synthesis of target compound DC1 and characterization thereof

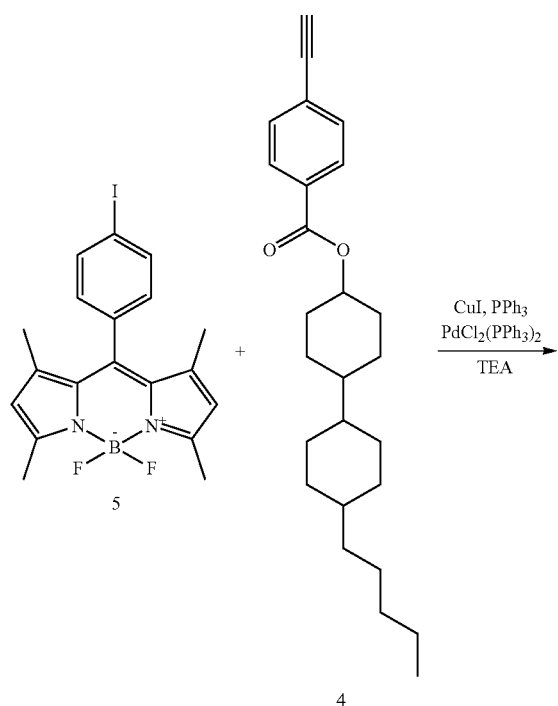

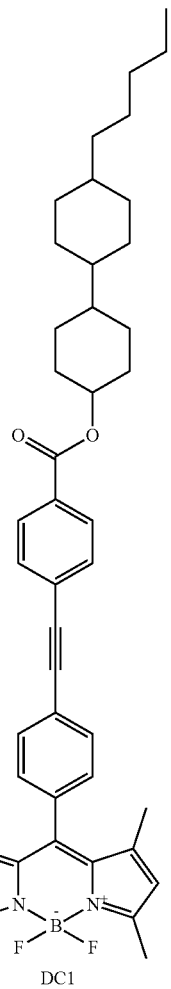

450 mg (1 mmol) 4-iodine-BODIPY (compound 5), 380 mg (1 mmol) compound 4, 18 mg $PdCl_2(PPh_3)_2$, 13 mg $PPh_3$, 10 mg CuI were added into a 50 mL double-necked round-bottomed flask with 20 mL of anhydrous triethylamine as solvent. The mixture was refluxed and reacted for 8 h under nitrogen protection and detected the completion of reaction by TLC. The mixture was cooled to room temperature, spin-dried, and separated by a silica gel column (eluent was DCM:PE=5:1) to obtain 393 mg of orange solid with a yield of 56%.

$^1$H NMR (400 MHz, $CDCl_3$) δ 8.04 (d, J=8.3 Hz, 1H), 7.68 (d, J=8.1 Hz, 1H), 7.60 (d, J=8.3 Hz, 1H), 7.31 (d, J=8.1 Hz, 1H), 5.99 (s, 1H), 4.97-4.81 (m, 1H), 2.56 (s, 3H), 2.13 (d, J=9.7 Hz, 1H), 1.83 (d, J=11.9 Hz, 1H), 1.75 (t, J=13.9 Hz, 2H), 1.49 (d, J=11.7 Hz, 1H), 1.43 (s, 3H), 1.35-1.19 (m, 4H), 1.17-1.08 (m, 3H), 1.08-0.91 (m, 2H), 0.88 (t, J=6.9 Hz, 2H).

$^{13}$C NMR (101 MHz, $CDCl_3$) δ 165.49 (s), 155.85 (s), 142.96 (s), 140.64 (s), 135.46 (s), 132.46 (s), 131.34 (d, J=27.3 Hz), 129.58 (s), 128.35 (s), 127.19 (s), 123.64 (s), 121.43 (s), 91.25 (s), 90.09 (s), 74.68 (s), 42.77 (s), 42.30 (s), 37.85 (s), 37.44 (s), 33.56 (s), 32.25 (s), 32.03 (s), 30.23 (s), 27.97 (s), 26.68 (s), 22.73 (s), 14.61 (s), 14.14 (s).

Melting point: 218° C.; clearing point: 274.3° C. TOF MS EI[+]: calculated value: ESI+MS(M+H):$C_{45}H_{53}BF_2N_2O_2$, calculated value: 702.4221, measured value: 702.4158.

Example 2

Synthesis of liquid crystal dye DC2

Except that propyl dicyclohexyl methyl methanol was used instead of pentyl dicyclohexyl methanol in step (4), and 4-ethynyl phenylpropyl dicyclohexyl methyl methanol esterate was used instead of 4-ethynylphenylpentyl dicyclohexyl methanol ester in step (6), the other operation steps were the same as in Example 1, to obtain 427 mg of a red solid with a yield of 62%.

$^1$H NMR (400 MHz, CDCl$_3$) δ 8.05 (d, J=8.3 Hz, 1H), 7.69 (d, J=8.1 Hz, 1H), 7.61 (d, J=8.3 Hz, 1H), 7.32 (d, J=8.1 Hz, 1H), 5.99 (s, 1H), 4.14 (d, J=6.4 Hz, 1H), 2.56 (s, 3H), 1.88 (s, 1H), 1.78 (d, J=8.8 Hz, 2H), 1.71 (d, J=13.8 Hz, 2H), 1.43 (s, 3H), 1.29 (dt, J=15.3, 7.7 Hz, 2H), 1.18 -1.11 (m, 2H), 1.04 (d, J=15.1 Hz, 3H), 1.01-0.91 (m, 1H), 0.87 (t, J=7.3 Hz, 2H).

$^{13}$C NMR (101 MHz, CDCl$_3$) δ 161.29 (s), 151.10 (s), 138.20 (s), 135.88 (s), 130.74 (s), 127.71 (s), 126.80 (s), 125.54 (s), 124.83 (s), 123.60 (s), 122.59 (s), 118.87 (s), 116.67 (s), 86.60 (s), 85.28 (s), 65.65 (s), 55.65 (s), 48.69 (s), 38.63 (s), 38.49 (s), 35.08 (s), 32.85 (d, J=7.3 Hz), 28.85 (s), 25.30 (d, J=6.6 Hz), 24.60 (s), 15.30 (s), 9.86 (s), 9.69 (s).

Melting point: 161° C.; clearing point: 237° C. ESI+MS (M+H): C$_{44}$H$_{51}$BF$_2$N$_2$O$_2$, calculated value: 688.4001, measured value: 688.4014.

Example 3

Synthesis of liquid crystal dye DC3

Except that cholesterol was used instead of pentyl dicyclohexyl methanol in step (4), and 4-ethynyl benzene cholesteryl ester was used instead of 4-ethynyl phenylpentyl dicyclohexyl methanol ester in step (6), the other operation steps were the same as Example 1, 560 mg of a red solid was obtained with a yield of 67%

$^1$H NMR (400 MHz, CDCl$_3$) δ 8.06 (d, J=8.5 Hz, 1H), 7.70 (d, J=8.3 Hz, 1H), 7.62 (d, J=8.5 Hz, 1H), 7.33 (d, J=8.3 Hz, 1H), 6.01 (s, 1H), 5.44 (d, J=3.4 Hz, 1H), 4.99-4.83 (m, 1H), 2.58 (s, 3H), 2.49 (d, J=7.6 Hz, 1H), 2.13-1.96 (m, 2H), 1.53 (dd, J=13.1, 6.6 Hz, 2H), 1.45 (s, 3H), 1.36 (d, J=7.9 Hz, 1H), 1.27 (s, 2H), 1.09 (s, 2H), 1.07-0.96 (m, 2H), 0.94 (d, J=6.5 Hz, 2H), 0.89 (d, J=1.8 Hz, 2H), 0.88 (d, J=1.8 Hz, 2H), 0.71 (s, 1H).

$^{13}$C NMR (101 MHz, CDCl$_3$) δ 165.36 (s), 155.87 (s), 142.96 (s), 140.64 (s), 139.57 (s), 135.48 (s), 132.42 (d, J=5.8 Hz), 131.50 (s), 129.59 (s), 128.36 (s), 127.26 (s), 122.92 (s), 121.42 (s), 91.31 (s), 90.08 (s), 74.93 (s), 56.72 (s), 56.17 (s), 50.08 (s), 42.35 (s), 39.77 (s), 39.54 (s), 38.24 (s), 37.05 (s), 36.68 (s), 36.22 (s), 35.82 (s), 31.94 (d, J=5.1 Hz), 28.25 (s), 27.97 (d, J=12.4 Hz), 24.32 (s), 23.86 (s), 22.84 (s), 22.59 (s), 21.09 (s), 19.39 (s), 18.75 (s), 14.61 (s), 11.89 (s).

Melting point: 251° C.; clearing point: 272° C. ESI+MS (M+H): C$_{55}$H$_{67}$BF$_2$N$_2$O$_2$, calculated value: 836.5321, measured value: 836.5248.

Property determination of the liquid crystal compound of the present invention (1) Spectral property test of liquid crystal compound DC in dichloromethane:

Test concentration: The concentration of the liquid crystal compound in different solvents was 1.0x10$^{-5}$ mol/L. 1.0x10$^{-2}$ mmol (±0.1 mg) of the prepared liquid crystal compound was accurately weighted, which was put into a 10 mL volumetric flask, and diluted the volume with CH$_2$Cl$_2$ to obtain a stocking solution with a concentration of 1.0x10$^{-3}$ mol/L. 100 μL of the stocking solution was pipetted into a 10 mL volumetric flask. After the solvent was completely evaporated, other solvents were used to be tested to obtain 1.0x10$^{-5}$ mol/L solution for UV absorption and fluorescence spectroscopy.

Determination of the $\Phi_F$ value of the fluorescence quantum yield of the liquid crystal compound: based on rhodamine b with a concentration of 1.0x10$^{-5}$ mol/L and the $\Phi_F$ value of 0.49. The required parameters were measured under the same test conditions and substituted into Formula (1) to calculate:

$$\Phi_{(sample)} = \Phi_{(standard)} \times \frac{\text{Abs}_{(standard)} \times Flu_{(sample)}}{\text{Abs}_{(sample)} \times Flu_{(standard)}} \quad (1)$$

wherein: $\Phi_{(sample)}$ and $\Phi_{(standard)}$ represented the $\Phi_F$ value of the sample and standard, respectively; Abs$_{(standard)}$ and Abs$_{(sample)}$ represented the absorbance of the standard and sample at the excitation wavelength; Flu$_{(sample)}$ and Flu$_{(standard)}$ represented the fluorescence intensity of the sample and standard, respectively.

The test results of the liquid crystal dye DC1-DC3 were as follows:

TABLE 1

UV and fluorescence data of compounds DC1-DC3 in dichloromethane

| Dyes | $\lambda_{max(A)}$ (nm) | logε | (nm) | $\lambda_{max(F)}$ (nm) | (nm) | $\Phi_F$ | Stokes shift (nm) |
|---|---|---|---|---|---|---|---|
| DC1 | 503 | 4.78 | 21 | 517 | 27 | 0.32 | 14 |
| DC2 | 503 | 4.72 | 20 | 518 | 24 | 0.37 | 15 |
| DC3 | 503 | 4.93 | 20 | 517 | 28 | 0.36 | 25 |

The synthesized target products DC1-DC3 had an emission wavelength of about 517 nm, showing green fluorescence, with a narrow emission half-peak width of about 27 nm, and high color recognition, which could be used in guest-host mode to achieve pure color display; the fluorescence quantum yield was about 0.32-0.37; the molar extinction coefficient was $10^{4.72}$-$10^{4.93}$.

(2) Polarization spectrum property test of compounds DC1-DC3 in liquid crystal:

Host liquid crystal: Liquid crystal E7 had a wide and stable nematic phase range (-10-60° C.), good chemical stability, and high positive dielectric anisotropy as the host liquid crystal.

Liquid crystal cell: the orientations of the upper and lower substrates of the liquid crystal cell for testing were parallel to each other, and the cell thickness was 20 μm.

Determination of dichroic ratio and order parameters: the liquid crystal compound DC was incorporated into the liquid crystal at a mass concentration of 0.5% (w/w), mixed uniformly at room temperature, and then the mixture was packed into a parallel liquid crystal cell, and the crystal filling port was sealed. The absorbance A$_∥$ in the parallel direction of the liquid crystal compound and the alignment film of the liquid crystal cell, the absorbance A$_⊥$ in the vertical direction, the fluorescence intensity in the parallel direction F$_∥$ and the fluorescence intensity in the vertical direction F$_⊥$ were tested; and according to the following Formula (2), (3), (4), (5) to calculate the absorption order parameter S$_A$, dichroic ratio D$_A$ and fluorescence order parameter S$_F$, dichroic of the liquid crystal compound D$_F$ series in the liquid crystal:

$$S_A = \frac{A_{//} - A_\perp}{A_{//} + 2A_\perp}; \quad (2)$$

$$D_A = \frac{A_{//}}{A_\perp}; \quad (3)$$

$$S_F = \frac{F_{//} - F_\perp}{F_{//} + 2F_\perp}; \quad (4)$$

$$D_F = \frac{F_{//}}{F_\perp}; \quad (5)$$

The polarization spectrum test results of the liquid crystal dye DC were as follows:

TABLE 2

Polarized UV and polarized fluorescence data of liquid crystal dye DC in liquid crystal E7

| Dyes | $\lambda_{max(A)}$ (nm) | | | | $\lambda_{max(F)}$ (nm) | | | |
|---|---|---|---|---|---|---|---|---|
| | $A_{//}$ | $A_\perp$ | $D_A$ | $S_A$ | $F_{//}$ | $F_\perp$ | $D_F$ | $S_F$ |
| DC1 | 505 | 505 | 8.91 | 0.73 | 529 | 528 | 8.16 | 0.70 |
| DC2 | 507 | 506 | 7.67 | 0.69 | 529 | 522 | 6.02 | 0.63 |
| DC3 | 507 | 505 | 4.26 | 0.52 | 525 | 523 | 3.45 | 0.45 |

It could be seen that the synthesized target compound DC series exhibited better dichroic ratio and order parameters in the host liquid crystal E7. The dichroic ratio of DC1 was as high as 8.16, and the absorption order parameter was up to 0.73. Similarly, the fluorescence dichroic ratio and fluorescence order parameter were also the highest, which were 8.16 and 0.70, respectively, which met the actual requirements for the dichroic ratio in the guest-host display mode.

(3) Liquid crystal behavior of the DC series of bidirectional dyes

Figure 3:
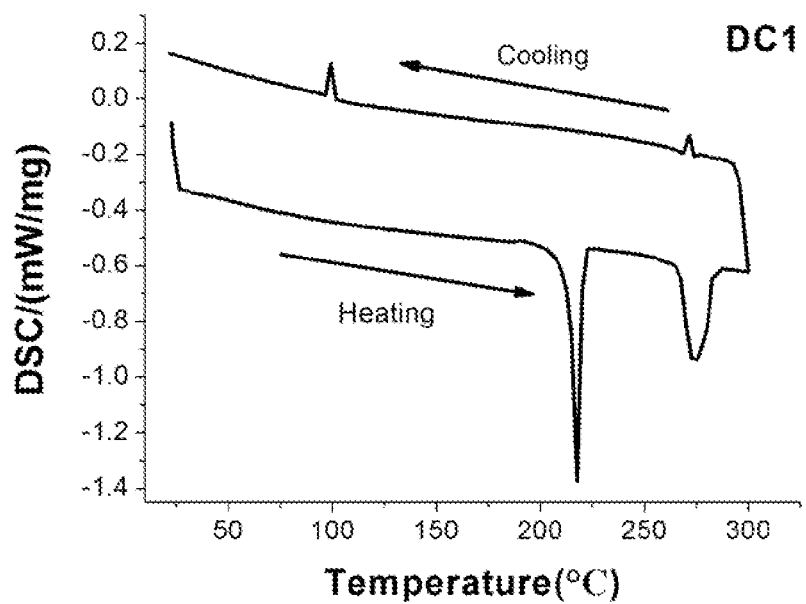
FIG. 3 is a differential thermal scanning calorimetry diagram of the liquid crystal compound DC1 prepared in Example 1.
Figure 4:
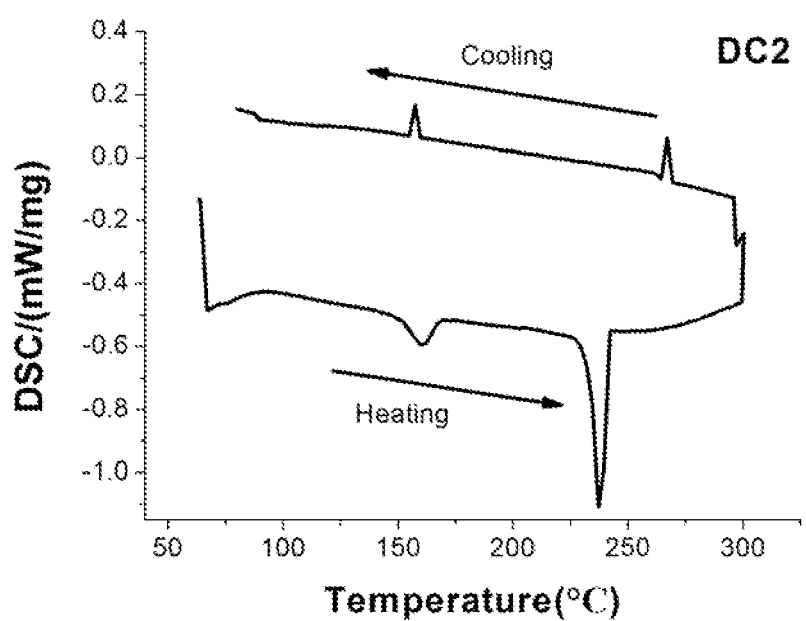
FIG. 4 is a differential thermal scanning calorimetry diagram of the liquid crystal compound DC2 prepared in Example 2.
Figure 5:
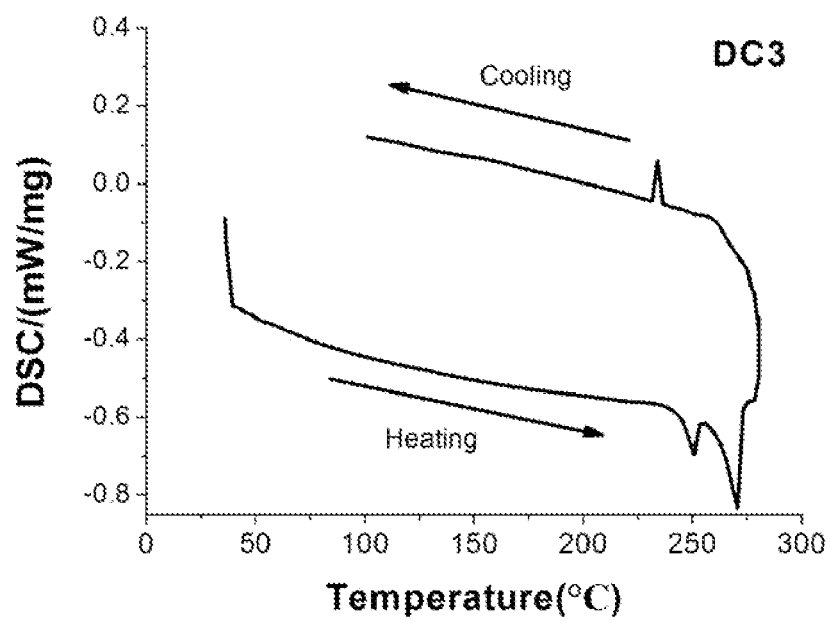
FIG. 5 is a differential thermal scanning calorimetry diagram of the liquid crystal compound DC3 prepared in Example 3.

Differential thermal scanning was performed on the prepared liquid crystal dye DC series compounds, and the differential thermal scanning calorimetry map was obtained. As shown in FIGS. 3-5, the intermediate phase appeared during the heating and cooling process. Compound DC1 presented a liquid crystal phase at 218-274.3° C. during the heating process, and a liquid crystal phase appeared at 98-271° C. during cooling. The range of the mesophase was about 150° C.; for compound DC2, a liquid crystal phase appeared at 161-237° C. when heated, and a wide liquid crystal phase range of 100° C. appeared at 156-266° C. when cooled; and for compound DC3, the intermediate phase only appeared during the heating process, and the range was 251-272° C.

(4) The influence of liquid crystal dye DC on the main liquid crystal E7

Liquid crystal response time measurement: the main liquid crystal was E7; the orientation of the upper and lower substrates of the test liquid crystal cell were parallel to each other, and the cell thickness was 10 μm; the liquid crystal dye DC was incorporated into the main liquid crystal E7 at a mass concentration of 0.5% (w/w), the influence of the guest dye DC on the host liquid crystal E7 was tested respectively.

Green light with a wavelength of 510 nm was used as the light source, and the transmission of the light source was collected by the detector. The driving voltage of the sample during the test was 0-10 V, the time from 10% to 90% of the relative brightness was the rise time $t_r$, and the time from 90% to 10% was the fall time tr. The response time was the sum of $t_r$ and $t_f$, ie. $t_r + t_f = t$.

Figure 6:
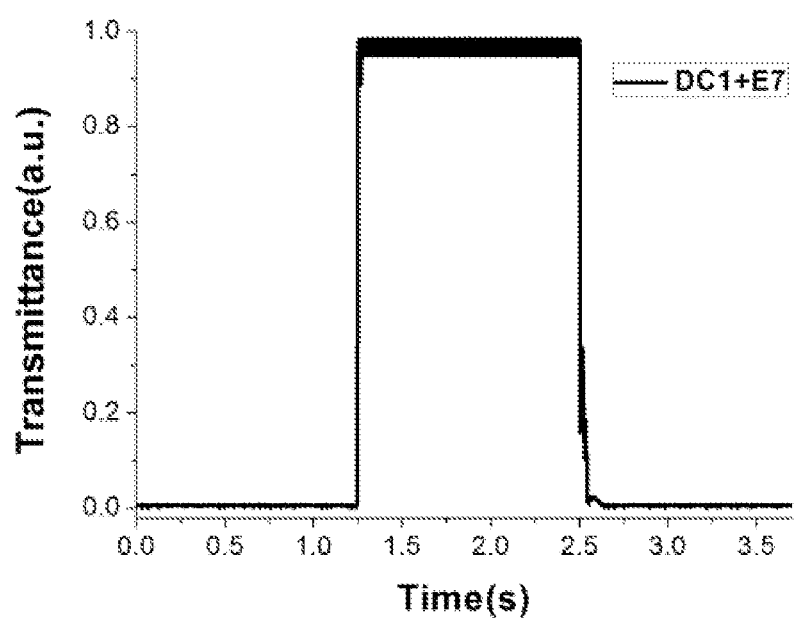
FIG. 6 is a graph showing the response time of the liquid crystal compound guest dye DC1 prepared in Example 1 in the host liquid crystal E7.
Figure 7:
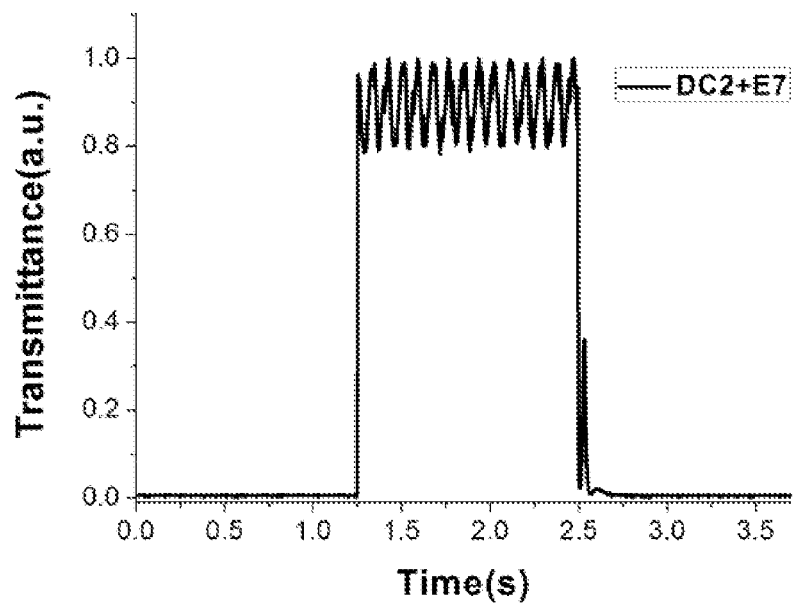
FIG. 7 is a graph showing the response time of the liquid crystal compound guest dye DC2 prepared in Example 2 in the host liquid crystal E7.
Figure 8:
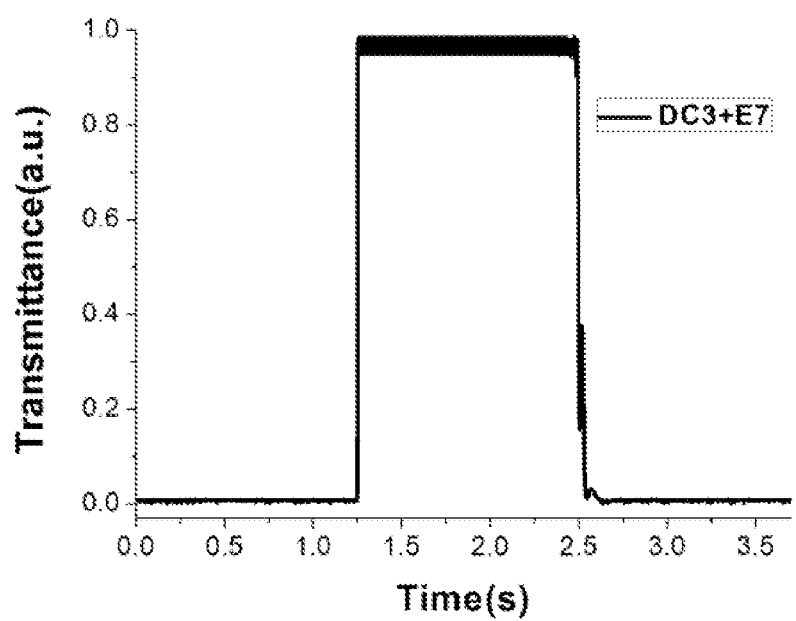
FIG. 8 is a graph showing the response time of the liquid crystal compound guest dye DC3 prepared in Example 3 in the host liquid crystal E7.

As shown in FIGS. 6-8, it was a graph of the response time of the guest dye DC series in the host liquid crystal E7

TABLE 3

Response time data of the host dye DC series compound in the host liquid crystal E7

| Dyes | Rise time $t_r$ (ms) | Fall time $t_f$ (ms) | Response time t (ms) |
|---|---|---|---|
| Main liquid crystalE7 | 1.62 | 46.23 | 47.85 |
| DC1+E7 | 1.62 | 38.67 | 40.29 |
| DC2+E7 | 1.24 | 45.65 | 46.89 |
| DC3+E7 | 1.35 | 39.04 | 40.39 |

The fluorescent bidirectional liquid crystal dye DC could change the response time of the liquid crystal, and DC could shorten the response time of the host liquid crystal E7, and the fastest response time was the DC1 doped host liquid crystal E7.

What is claimed is:

1. A compound having a structural formula of Formula B:

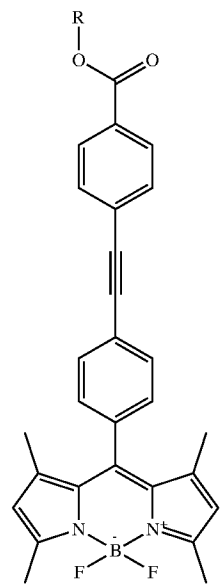

wherein R is selected from the group consisting of propyl dicyclohexyl methyl, butyl dicyclohexyl methyl, pentyl dicyclohexyl methyl, propyl dicyclohexyl ethyl, butyl dicyclohexyl ethyl, pentyl dicyclohexyl ethyl, and cholesteryl.

2. A method for preparing the compound of claim 1, comprising:
   reacting p-iodobenzoyl chloride and 2,4-dimethylpyrrole in dichloromethane as a solvent in presence of triethylamine, then adding boron trifluoride etherate for coordination to form a boron-dipyrromethene parent;
   reacting p-iodobenzoic acid with trimethylsilylacetylene by Sonogashira coupling reaction to form a reaction product;
   desiliconizing the reaction product in ethanol as solvent in presence of potassium hydroxide to form 4-ethynyl benzoic acid;
   reacting 4-ethynyl benzoic acid with a compound selected from propyl dicyclohexyl methanol, butyl dicyclohexyl methanol, pentyl dicyclohexyl methanol, propyl dicyclohexyl methyl methanol, butyl dicyclohexyl methyl methanol, pentyl dicyclohexyl methyl methanol, and cholesterol in dichloromethane as solvent in presence of dicyclohexylcarbodiimide and a catalytic amount of 4-dimethylaminopyridine to form an ester, wherein the ester is selected from 4-ethynyl phenylpropyl dicyclohexyl methanol ester, 4-ethynyl phenylbutyl dicyclohexyl methanol ester, 4-ethynyl phenylpentyl dicyclohexyl methanol ester, 4-ethynyl phenylpropyl dicyclohexyl methyl methanol ester, 4-ethynyl phenylbutyl dicyclohexyl methyl methanol ester, 4-ethynyl phenylpentyl dicyclohexyl methyl methanol ester, and 4-ethynyl phenyl cholesteryl ester; and linking the boron-dipyrromethene parent with the ester by Sonogashira coupling reaction.

3. The method for preparing a liquid crystal material, comprising mixing the compound of claim 1 with liquid crystal E7.

4. A liquid crystal display product comprising the compound according to claim 1.

5. The liquid crystal display product of claim 4, which is a guest-host liquid crystal display.

* * * * *